T. McWATTERS.
SAFETY DEVICE FOR ELEVATOR CAGES.
APPLICATION FILED JULY 22, 1914.

1,165,010.

Patented Dec. 21, 1915.
2 SHEETS—SHEET 1.

T. McWATTERS.
SAFETY DEVICE FOR ELEVATOR CAGES.
APPLICATION FILED JULY 22, 1914.

1,165,010.

Patented Dec. 21, 1915.
2 SHEETS—SHEET 2.

WITNESSES
W. A. Hirtle
Clarence A. Williams

INVENTOR
Thomas McWatters
by John H. Roney
his ATTORNEY

UNITED STATES PATENT OFFICE.

THOMAS McWATTERS, OF CHESTNUT RIDGE, PENNSYLVANIA.

SAFETY DEVICE FOR ELEVATOR-CAGES.

1,165,010.

Specification of Letters Patent. Patented Dec. 21, 1915.

Application filed July 22, 1914. Serial No. 852,360.

*To all whom it may concern:*

Be it known that I, THOMAS McWATTERS, a subject of the King of Great Britain, residing at Chestnut Ridge, in the county of Fayette and State of Pennsylvania, have invented a new and useful Improvement in Safety Devices for Elevator-Cages, of which improvement the following is a specification.

My invention relates to safety locks for elevator cages and is peculiarly applicable to cages used in coal shafts.

Figure 1:
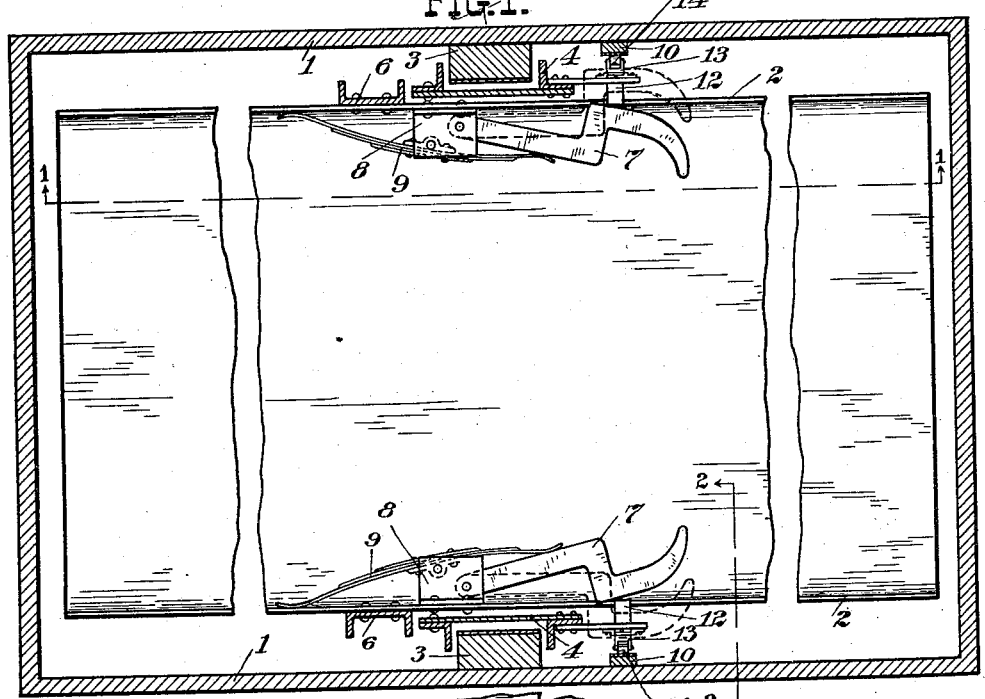
Figure 2:
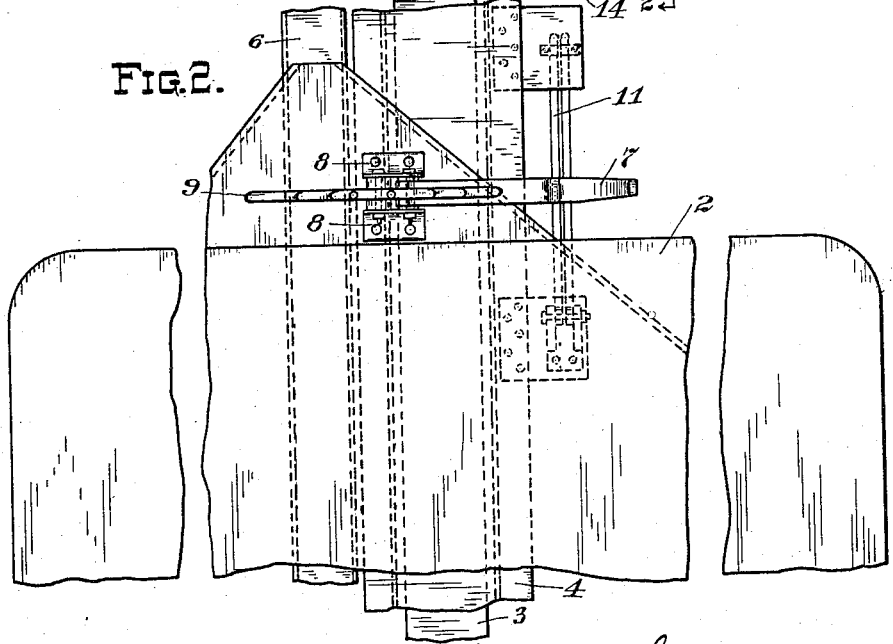
Figure 3:
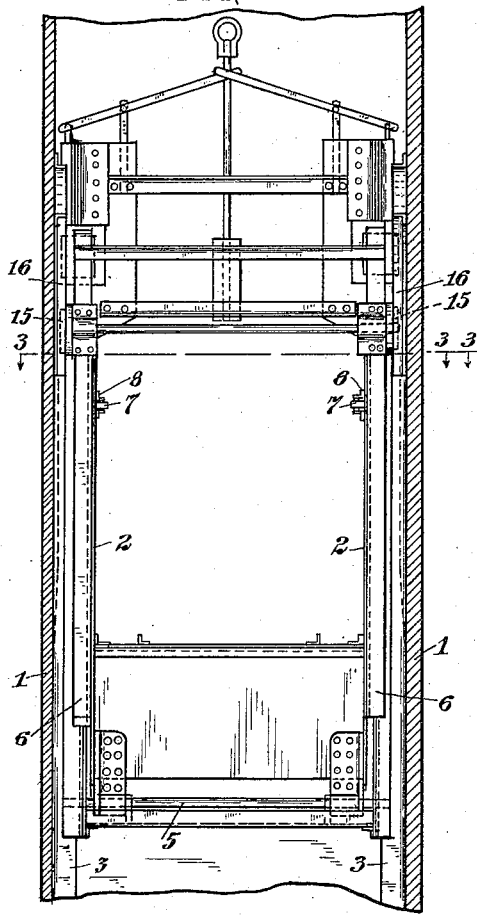
Figure 4:
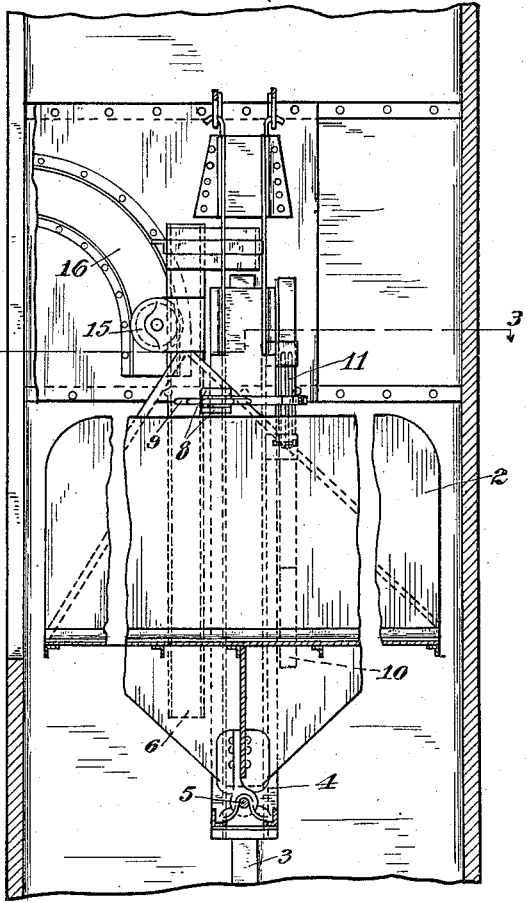
Figure 5:
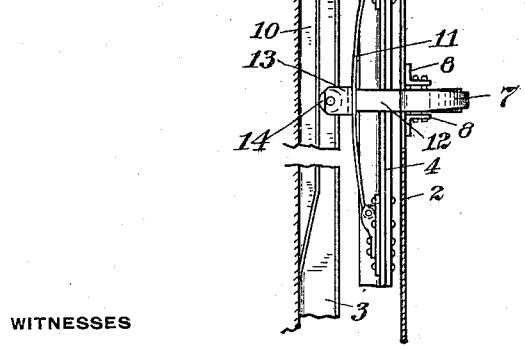

The object of my invention is to produce an automatic locking mechanism that will prevent the undesirable tilting of the cage and one which, however, is operative automatically at the proper time when it is desirable to permit the tilting or turning over of the cage to discharge the contents thereof. I accomplish this by means of the device hereinafter more specifically described, reference being had to the accompanying drawings forming part hereof in which, Figure 1 is a transverse section on line 3—3 of Figs. 3 and 4. Fig. 2 is a section on line 1—1 of Fig. 1 looking in the direction of the arrows. Fig. 3 is a transverse sectional view through the cage and shaft, taken on a plane at right angles to that of Fig. 2 and at one side of the center. Fig. 4 is a sectional elevation on line 1—1 of Fig. 1, including the entire cage. Fig. 5 is an enlarged sectional detail on line 2—2 of Fig. 1.

Referring to said drawings, 1—1 are the walls of the shaft in which the cage 2 is adapted to travel, the said cage being supported therein in any suitable manner and capable of being elevated and lowered therein in the usual way. The said shaft is provided with a guide 3 secured in the sides thereof over or upon which the cage is adapted to travel, the said cage having for this purpose an angle member 4 which is secured to the cage and is adapted to travel therewith, being secured to said cage by the shaft 5 which extends transversely of the cage and on which the cage proper is pivotally mounted and adapted to swing when the same is tilted, as hereinafter described, when discharging its contents. The said cage is provided with longitudinally disposed members 6 on opposite sides, consisting of angle bars secured to the sides of said cage, the edge of which adjacent to the edge of the angle member 4 by contacting therewith prevents the cage tilting in one direction, the automatic lock mechanism hereinafter described serving to prevent the cage tilting in the opposite direction until it is desired to discharge the contents thereof when the lock mechanism is automatically released. The said lock mechanism comprises a lock bar 7—7, one end of which is pivotally mounted between angle bars 8 secured to the inner wall of the cage and is adapted to be held in the operative or locked position shown in dotted line, Fig. 1, by means of the blade spring 9—9 which is mounted between said angle bars 8. A member 10 is secured to the wall of the shaft at each side thereof, the lower portion of which is inclined. A heavy blade spring 11 is secured to the angle member 4 and carries a projecting abutment 12 on one side, adapted to engage the lock bar and force the same out of operative position, as shown in Fig. 1, and on the other side a block 13, the inner face of which is formed like a clevis in which is mounted a roller 14 adapted to engage upon the edge of the member 10 and as the cage ascends to force the projecting abutment 12 against the lock bar throwing the said bar out of locked position, the continued upward travel of the cage causing the roller 15 to enter the inclined way 16 secured in the upper part of the shaft, thereby tilting the cage and discharging the contents. The said roller is mounted in a bracket secured upon the upper side of the cage, as shown in Fig. 4.

The operation of my device is as follows: The cage being at any time below the plane of members 10, the lock mechanism is thrown into the position shown in dotted lines, Fig. 1, which position brings the inner edge of the shoulder in position to engage the opposite or adjacent edge of member 4 and thus prevent the cage tilting on its pivotal support in one direction, the angle members 6 preventing the cage tilting in the other direction. The cage is thus in position to travel upward in the shaft without danger of tilting in either direction until it arrives at the top of the shaft when the roller carried by the spring 11 encounters and engages upon, first, the inclined portion of member 10 and finally the plane portion thereof, forcing the lock bar inwardly, as shown in Fig. 1, thus permitting the cage to be turned or tilted on its shaft as the roller 15 engages the ways 16.

Having described my invention what I claim and desire to secure by Letters Patent is:

1. A device of the character described including an upright guide member, a cage mounted to travel upon the guide member and provided with a channel member receiving the same, a tiltable platform member pivotally mounted upon the cage, a stop carried by the platform member and coöperating with one side of the channel member to prevent tilting of the platform member in one direction, a pair of spaced ears projecting from the platform member, a latch member pivotally mounted between the ears and adapted to engage the opposite side of the channel member to prevent tilting of the platform member in the opposite direction, a leaf spring secured at an intermediate point in its length between the ears so that one end thereof engages the platform member while the opposite end thereof engages the latch member to swing the latter into operative position, and cam actuated means for automatically swinging the latch member into an inoperative position when the cage reaches a predetermined position.

2. A device of the character described including an upright guide, a cage mounted to travel upon the guide and formed with a channel member receiving the same, a tiltable platform member pivotally mounted upon the cage, means for preventing tilting of the platform member in one direction, a spring latch member adapted to engage one side of the channel member to prevent tilting of the platform member in the opposite direction, a pair of arms projecting from the channel member, a leaf spring connected at its ends to the said arms and provided at an intermediate point with oppositely projecting abutments, one of the abutments being adapted to engage the latch member to swing the same into inoperative position, and a cam member arranged in the path of the opposite abutment for automatically flexing the spring to release the latch member when the cage reaches a predetermined position.

In testimony whereof, I have hereunto signed my name in the presence of two subscribing witnesses.

THOMAS McWATTERS.

In the presence of—
J. VANCE GRAFT,
CORA B. WYNCOOP.

Copies of this patent may be obtained for five cents each, by addressing the "Commissioner of Patents, Washington, D. C."